United States Patent [19]

Northey

[11] 4,346,930
[45] Aug. 31, 1982

[54] CONVERTIBLE CAR AND METHOD OF MAKING SAME

[75] Inventor: Charles R. Northey, Boca Raton, Fla.

[73] Assignee: Grandeur Motorcar Corporation, Pompano Beach, Fla.

[21] Appl. No.: 134,877

[22] Filed: Mar. 28, 1980

[51] Int. Cl.³ .............................................. B60J 7/00
[52] U.S. Cl. .................................. 296/107; 29/401.1; 296/10; 296/188; 296/193
[58] Field of Search ............... 296/10, 103, 107, 108, 296/210, 180, 193, 194, 195; 29/401.1

[56] References Cited

U.S. PATENT DOCUMENTS

| | | | |
|---|---|---|---|
| 1,024,634 | 4/1912 | Klell | 296/103 |
| 3,940,176 | 2/1976 | Ito | 296/188 |
| 4,234,225 | 11/1980 | Harasaki | 296/188 |
| 4,238,876 | 12/1980 | Monroe | 29/401.1 |

Primary Examiner—Joseph F. Peters, Jr.
Assistant Examiner—John A. Carroll
Attorney, Agent, or Firm—Oltman and Flynn

[57] ABSTRACT

A hard-roofed two-door Toyota sedan is made into a convertible by the following steps:
(1) removing the hard roof from the car body at the level of the top of its doors;
(2) welding longitudinal reinforcing tubes in the rocker panels;
(3) welding reinforcing plates to the opposite sides of the car body at the inside just above the floor between the rear wheel wells and the door posts;
(4) welding reinforcing plates to the sides of the car body at the inside just above the floor immediately in front of the door opening on that side; and
(5) attaching a pivoted linkage for operating the convertible top to the opposite sides of the car body.

20 Claims, 27 Drawing Figures

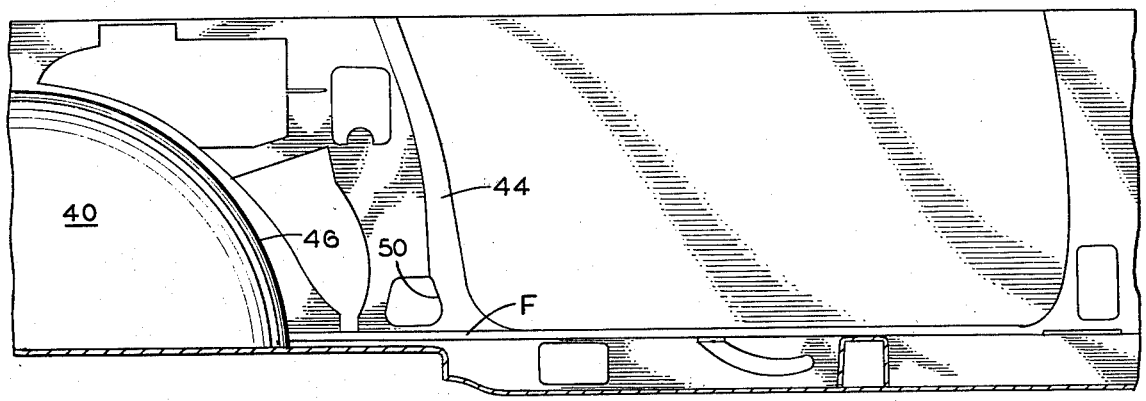
FIG. 6
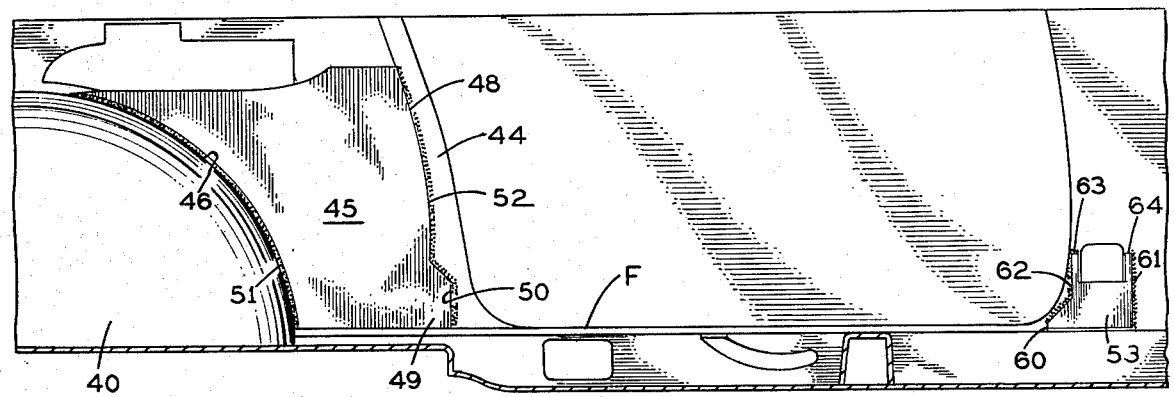
FIG. 7
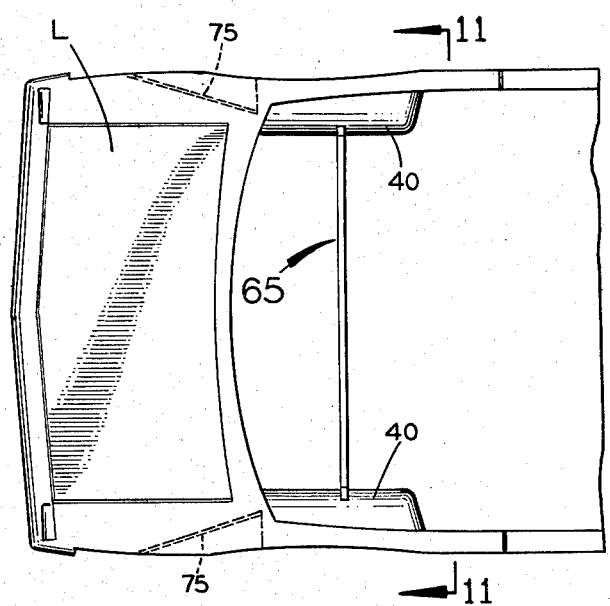
FIG. 10
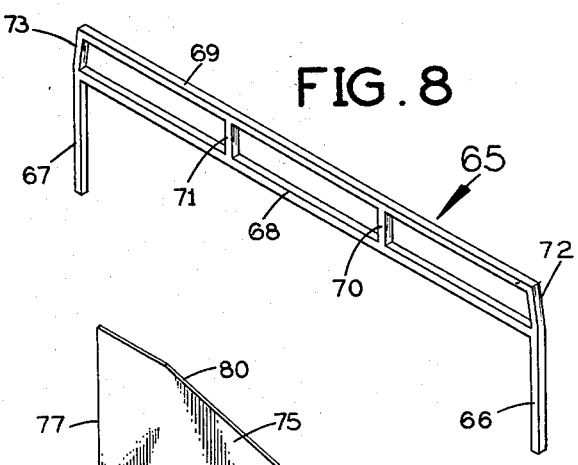
FIG. 8
FIG. 9

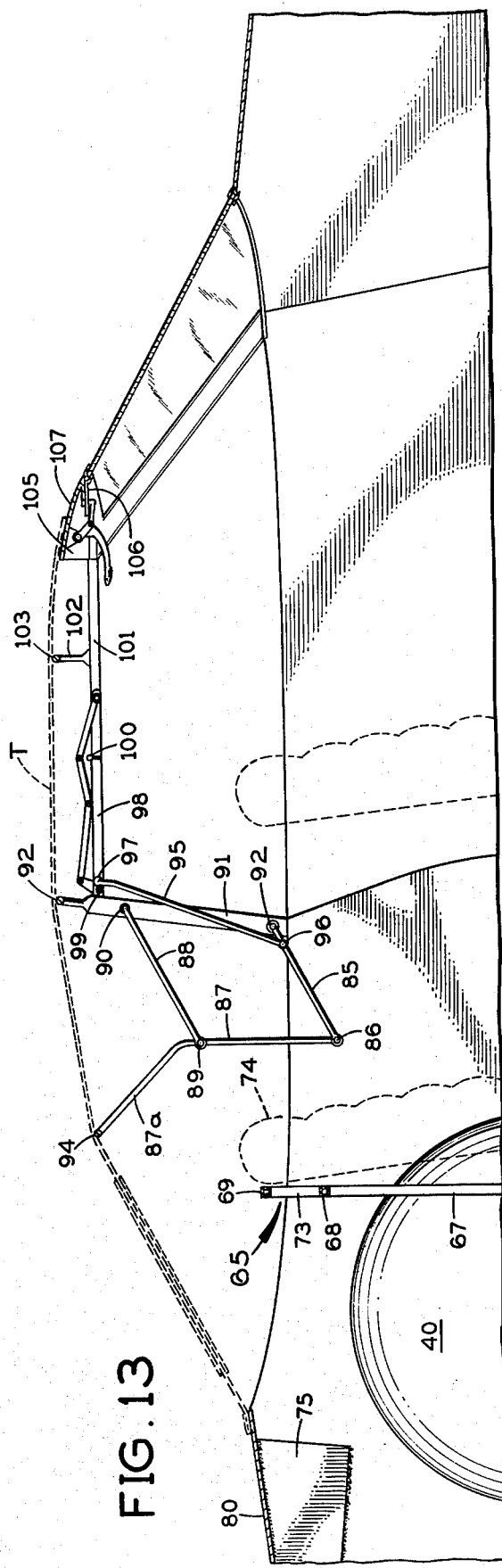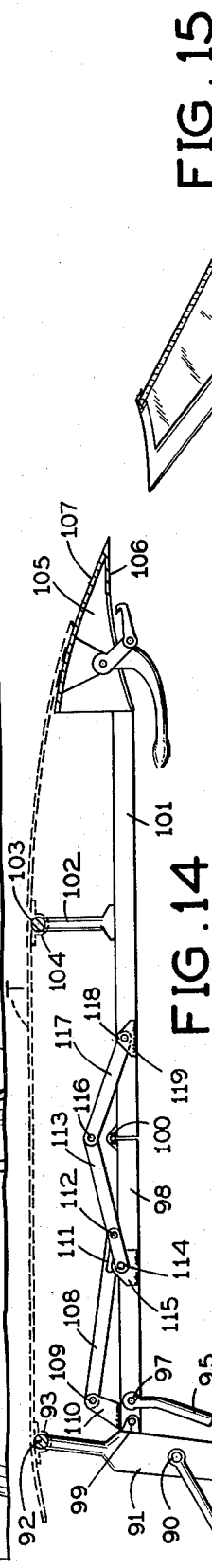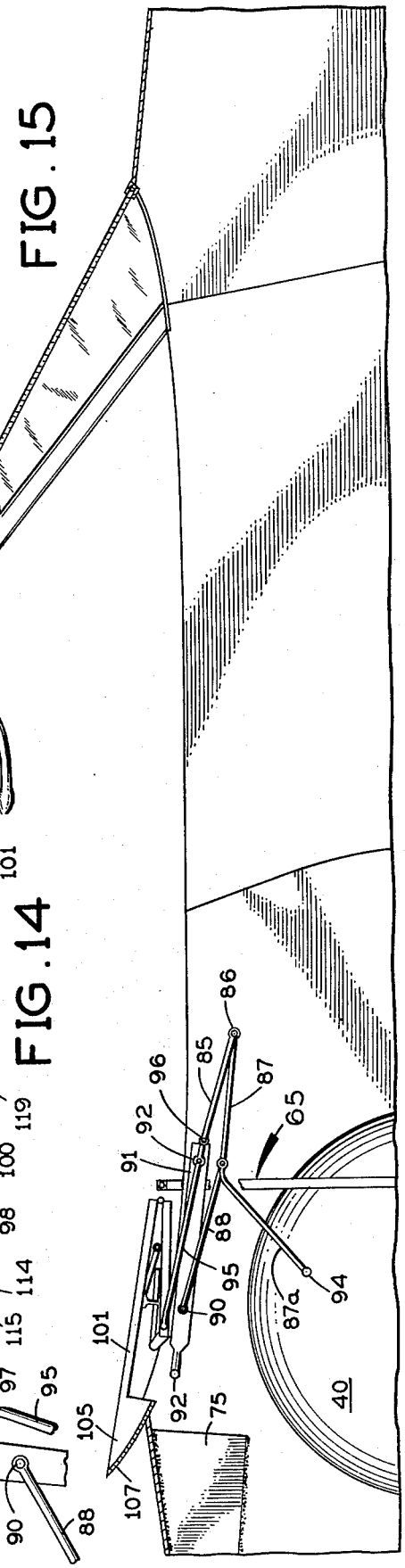

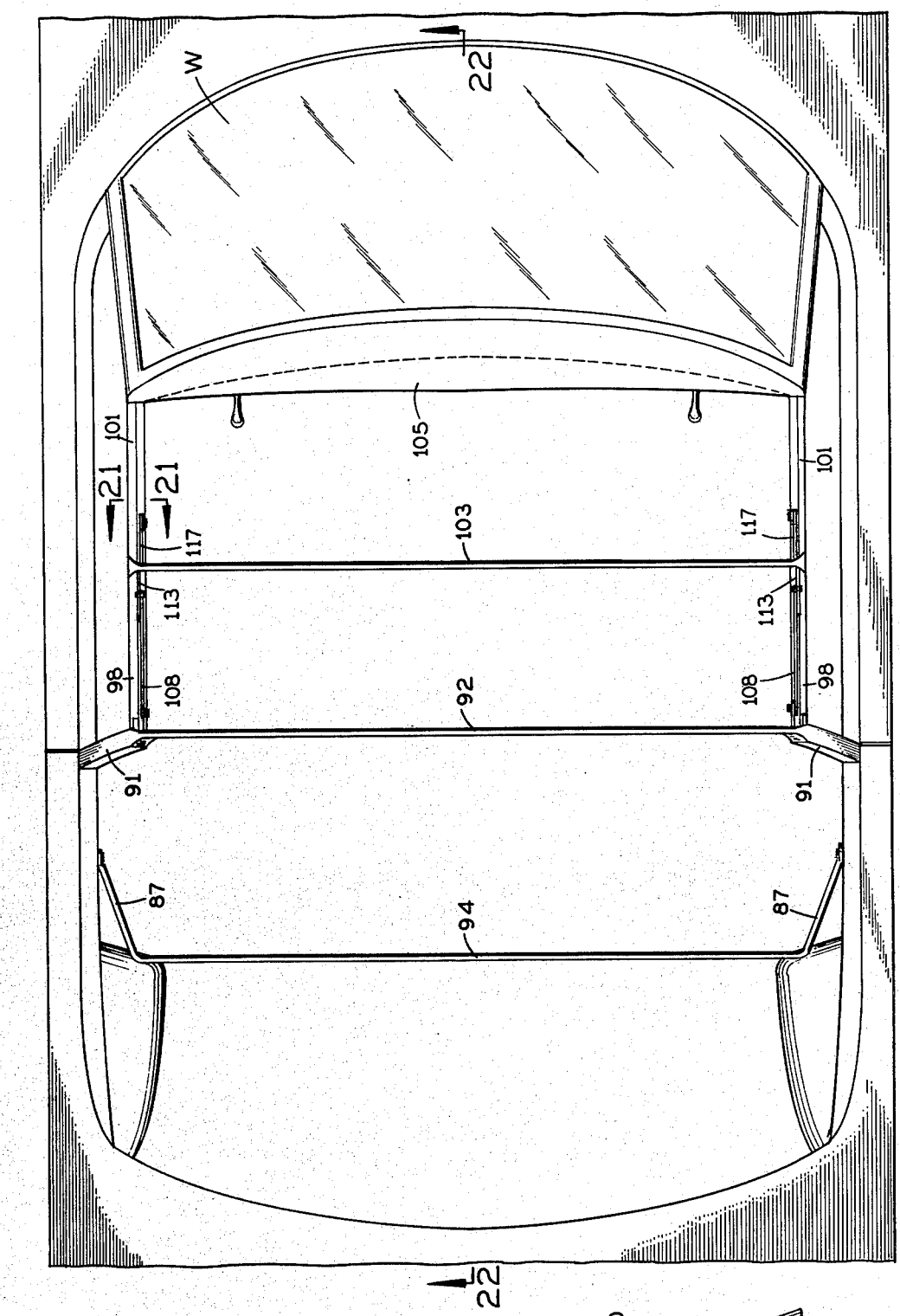
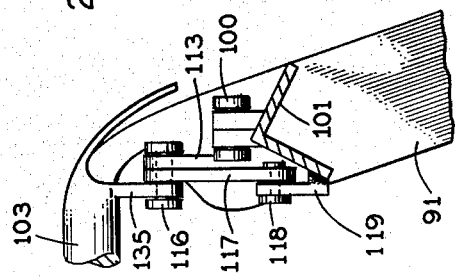
FIG. 20
FIG. 21

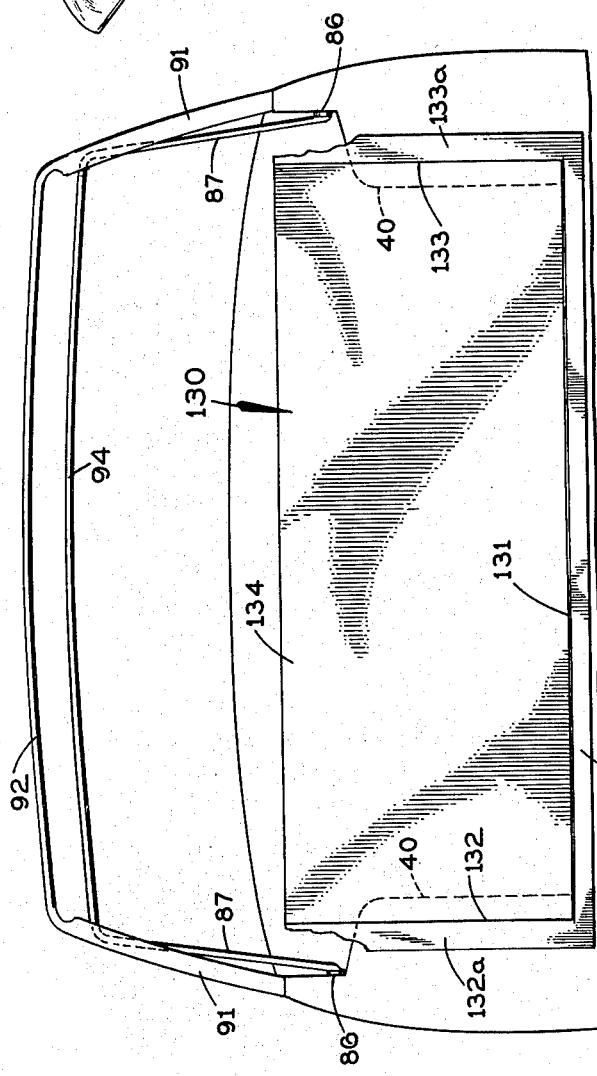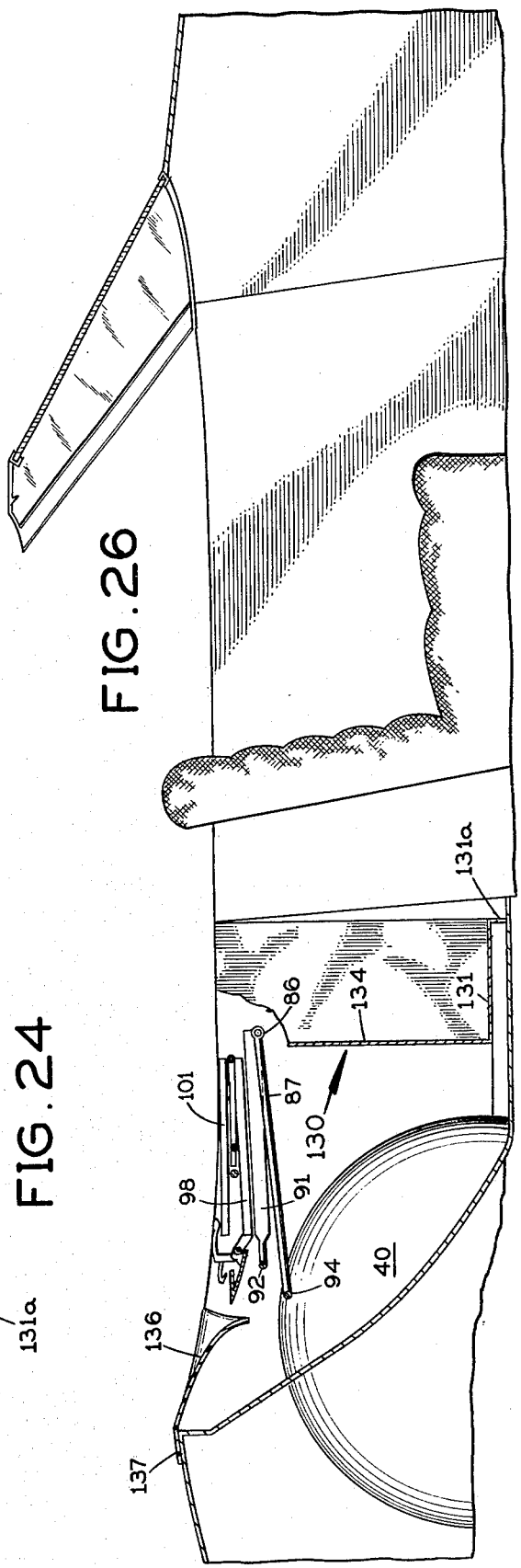

CONVERTIBLE CAR AND METHOD OF MAKING SAME

SUMMARY OF THE INVENTION

This invention relates to a passenger car with a convertible top and to a method of changing a hard-roofed passenger sedan to one with a convertible top.

In the presently-preferred embodiment of this invention, a 1980 Toyota sedan, which may either be a four seat or a two seat model, is modified by the removal of its hard roof, the reinforcement of its body at critical locations to enhance its structural rigidity and strength, and the attachment of a convertible top and its operating linkage to the reinforced body. The rocker panels are reinforced by the insertion of reinforcing tubes along substantially their entire length between the front and rear wheel walls. The car body is reinforced by applying reinforcing plates to its sides just above the floor immediately in front of the rear wheel wells and just above the floor immediately in front of the door openings. An operating linkage for the convertible top is mounted on opposite sides of the car body.

On four seat sedans, a reinforcing frame is mounted inside the car body directly behind the rear seat and reinforcing plates are located between the sides and the top of the car body immediately in front of the trunk lid.

On two seat sedans, an open-sided box-like reinforcing frame is mounted inside the body directly behind the front seats.

A principal object of this invention is to provide a novel convertible passenger car with a reinforced body.

Another principal object of this invention is to provide a novel method of converting a hard-roofed passenger car to one with a retractable, flexible convertible top.

Further objects and advantages of this invention will be apparent from the following detailed description of two presently preferred embodiments thereof, one of which is directed to a four seat car and the other of which is directed to a two seat car, as illustrated in the accompanying drawings.

DESCRIPTION OF THE DRAWINGS

FIG. 6 is a view taken along the vertical longitudinal section line 6—6 in FIG. 2 and showing the inner side of one side of the car body;

FIG. 7 is a view similar to FIG. 6 with one of the larger reinforcing plates of FIG. 5 welded in place just above the floor at the front of the rear wheel well on this side of the car body and the smaller reinforcing plate of FIG. 5 welded to this side of the car body just above the floor in front of the door opening;

FIG. 8 is a perspective view of the reinforcing frame for use behind the rear seat in this car;

FIG. 9 is a perspective view of another reinforcement plate for the four-seat car;

FIG. 10 is a fragmentary top plan view of the car body with the reinforcement frame of FIG. 8 and two of the FIG. 9 reinforcement plates in place;

FIG. 13 is a vertical longitudinal section taken along the line 13—13 in FIG. 12;

FIG. 14 is a side elevation of the operating linkage at one side of the car body when the convertible top is almost fully extended;

FIG. 15 is a side elevation showing this linkage retracted;

FIG. 20 is a top plan view of a two-seat car (with the convertible top removed for clarity) in accordance with a second embodiment of this invention;

FIG. 21 is a fragmentary vertical cross-section taken along the line 21—21 in FIG. 20 and showing part of the operating linkage for the convertible top at one side of the car;

FIG. 24 is a vertical cross-section taken along the line 24—24 in FIG. 22;

FIG. 25 is a perspective view of a flexible panel in the back end of the convertible top;

FIG. 26 is a vertical section taken along the longitudinal centerline of the two-seat car with the convertible top down.

Before explaining the disclosed embodiments of the present invention in detail, it is to be understood that the invention is not limited in its application to the details of the particular arrangements shown since the invention is capable of other embodiments. Also, the terminology used herein is for the purpose of description and not of limitation.

DETAILED DESCRIPTION

Four-Seat Car—FIGS. 1-19

Figure 1:
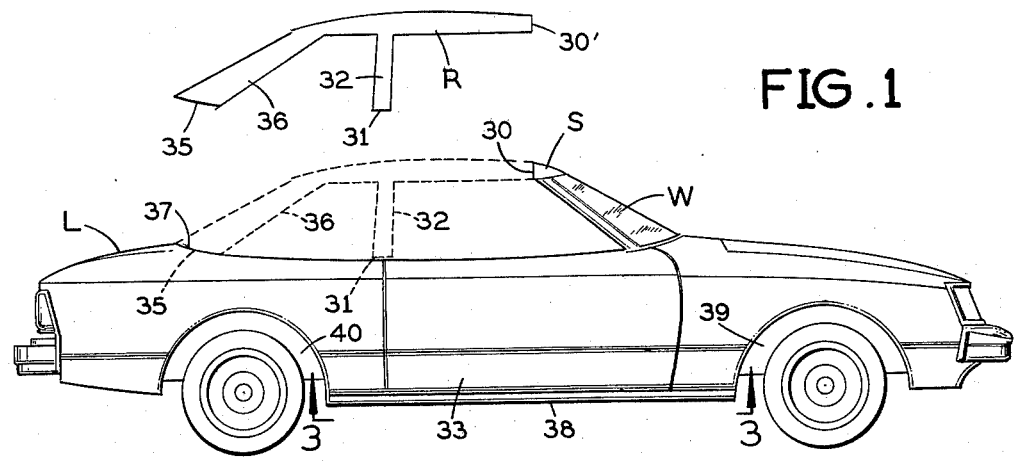
FIG. 1 is a side elevational view of a hard-roofed four seat car, with the roof shown in phantom attached to the car body and in full lines after being detached in accordance with the present invention.
Figure 2:
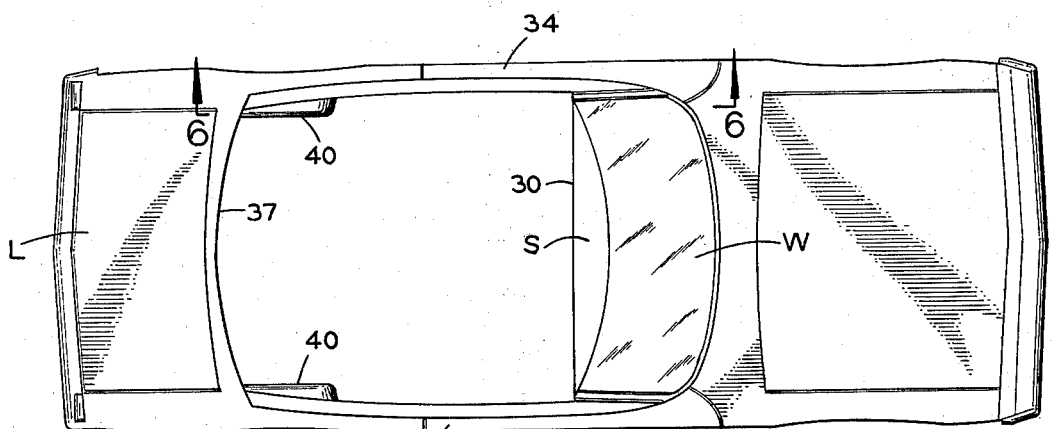
FIG. 2 is a top plan view of the FIG. 1 car after the removal of its hard roof, the front and rear seats, and the shelf behind the rear seat directly in front of the rear window.

FIG. 1 shows a four-seat, two-door, hard-roofed 1980 Toyota sedan which is to be changed to a convertible in accordance with the present invention. The first step of the process is to remove the seats, the shelf behind the back seat, and the hard roof R, leaving in place just a short sector S of this roof immediately behind the top of the curved windshield W. This is done by cutting the roof along a vertical plane extending from side-to-side, leaving an edge 30 which extends from the top of the curved windshield W at one side of the car to the top of the windshield at the opposite side, as shown in FIG. 2. The corresponding edge of the removed roof R is shown at 30' in FIG. 1. The hard roof R also is cut from the body of the car at the bottom 31 of each roof post 32 behind the respective car doors 33 and 34. Also, the hard roof R is cut from the body of the car at the bottom 35 of each side panel 36 on opposite sides of the rear window. The window pane at each side behind the respective roof post 32 is removed, as is the rear window. The front seat windows on each side are lowered into the respective doors 33 and 34 in the usual manner. This leaves the car body open at the top between the hard roof edge 30 at the front and the curved rear edge 37 of the passenger compartment directly in front of the hinged trunk lid L.

In accordance with the present invention, the rocker panels 38 (FIG. 1) on each side of the car body are reinforced along substantially the entire length of each between the front wheel well 39 and the rear wheel well 40 on that side. Referring to FIG. 4, this is done by cutting a rectangular opening 41 along the bottom of the rocker panel and inserting a hollow reinforcing tube 42 of rectangular cross-section up through this opening and welding it in place along the opposite edges of the bottom opening 41, as shown at 43 in FIGS. 3 and 4. The height of the reinforcing tube 42 matches the interior height of the rocker panel where it is received, so that when welded in place (FIG. 4) the reinforcing tube 42 has it horizontal top wall 42a directly engaging beneath the horizontal top wall 38a of the rocker panel 38. The reinforcing tube 42 is in this position along substantially the entire length of the rocker panel 38 to enhance the latter's structural strength and rigidity.

Behind each door post 44 (FIG. 6) on the car body a reinforcing plate 45 (FIG. 5) is welded in place just above the floor F between the door post 44 and the curved front end 46 of the rear wheel well 40, as shown in FIG. 7. This reinforcing plate 45 has a concave rear edge 47 which is complementary to the convex front edge 46 of the rear wheel well 40. Also this, reinforcing plate has a slightly convex front edge 48 which mates with the rear edge of the door post 44 and extends down to a forwardly offset segment 49 at the bottom which fits snugly in a correspondingly shaped notch 50 in the rear of the door post just above the floor. The reinforcing plate 45 is joined to the car body by welding along its entire rear edge and along its entire front edge, as shown at 51 and 52, respectively, in FIG. 7.

In front of each door opening in the car body a smaller reinforcing plate 53 (FIG. 5) is welded in place just above the floor. This plate has a short horizontal flange 54 which extends perpendicular to the vertically positioned main body of this plate. This plate presents upwardly projecting fingers 55, 56 at the top. The front edge 57 of the plate extends straight down from the top finger 56. At the rear, the plate presents a vertical edge 58 extending down the full length of the finger 55 and a short distance below, a rearwardly and downwardly inclined edge 59 extending down from the vertical rear edge 58, and a short vertical edge 60 (FIG. 7) at the bottom. The reinforcing plate 53 is welded to the inside of the corresponding side of the car body along its complete front and rear edges, as shown at 61 and 62 in FIG. 7, and across the top edges of the fingers 55 and 56, as shown at 63 and 64 in FIG. 7.

Figure 11:
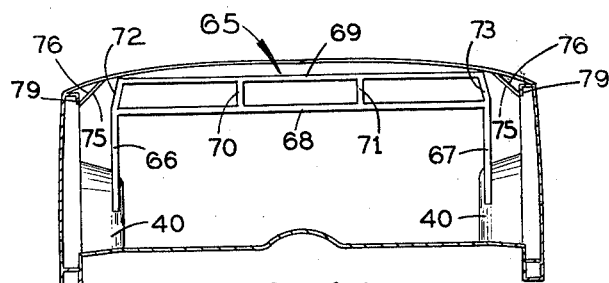
FIG. 11 is a vertical cross-section taken along the line 11—11 in FIG. 10.
Figure 12:
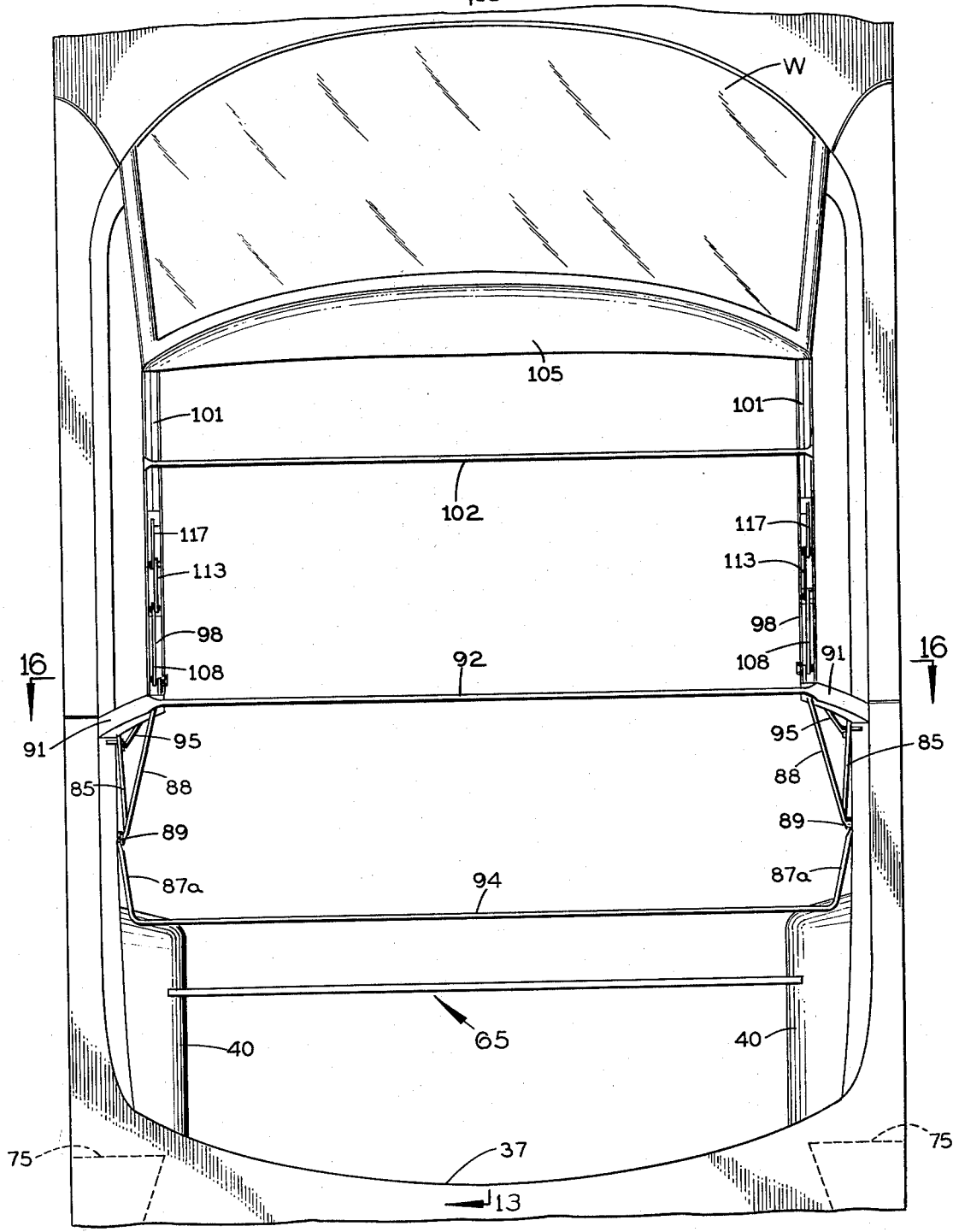
FIG. 12 is a top plan view of the car after the operating linkage for the retractable convertible top is mounted on the car body.
Figure 16:
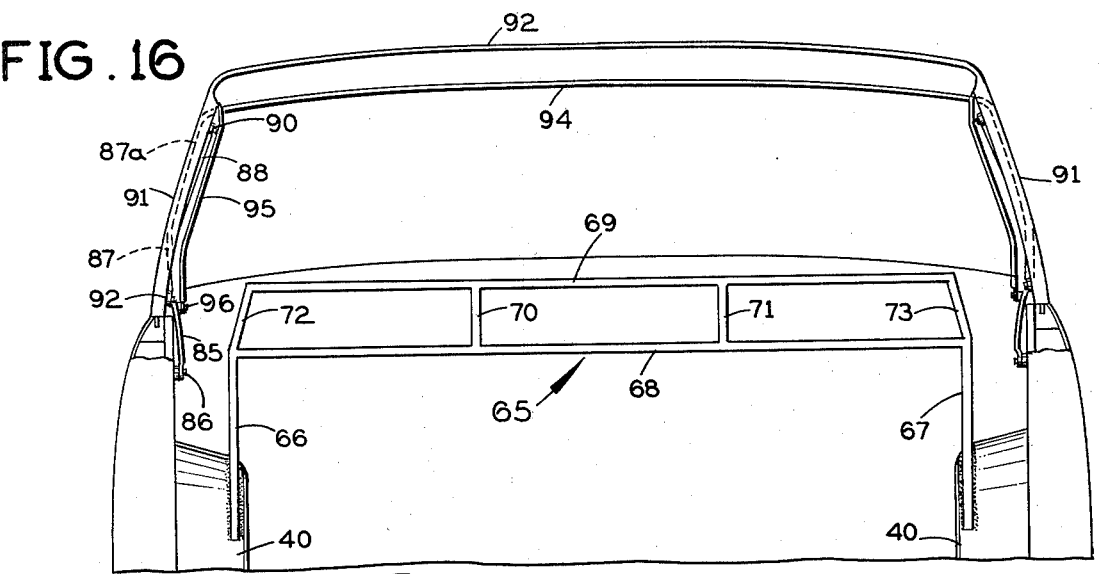
FIG. 16 is a vertical cross-section taken along the line 16—16 in FIG. 12.

In the four-seat car under discussion, a reinforcing frame 65 (FIG. 8) is attached to the car body, extending behind the rear seat as shown in FIG. 13. Referring to FIG. 8, this reinforcing frame comprises a pair of upstanding legs 66 and 67 at its opposite ends, a horizontal intermediate rail or cross-piece 68 extending between these legs at their upper ends, and an upper horizontal rail or cross-piece 69 extending a short distance above rail 68 and connected to it by inner vertical legs 70, 71 and outer legs 72, 73, which are inclined laterally outward and downward into vertical alignment at their lower ends with the legs 66 and 67, respectively. The legs 66, 67 of this frame are welded at their lower ends to the front of the respective rear wheel wells 40 near the inside of the latter, as shown in FIGS. 10, 11 and 13. As shown in phantom in FIG. 13, the back edge of the rear seat backrest 74 at the top will extend just in front of the top rail 69 of this reinforcing frame.

Also, in the four-seat car under discussion two reinforcing plates 75 (FIG. 9) are welded to the inside of the car body on each side above and behind the respective rear wheel wells 40. The shortest edge 76 of this plate is at its front end in the car and the opposite edge 77 is at the rear. As shown in FIG. 11, each plate lies in a plane extending at an angle of about 45 degrees laterally inward and upward. Each plate is welded along its bottom edge 78 to a downwardly extending flange 79 (FIG. 11) which is offset laterally inward from the respective side of the car body. The top edge 80 of each reinforcing plate 75 is welded to the bottom of the deck of the car body at that side of the trunk lid L, as shown in FIG. 13 and indicated in phantom in FIG. 10.

The linkage for supporting and retracting the flexible convertible top T (shown in phantom in FIGS. 13 and 14) is the same at each side of the car. It includes a first rigid linkage arm 85 whose lower end is pivoted horizontally at 86 to the side of the car body. A second rigid linkage arm 87, pivoted on the same pivot 86, extends upward and then is bent to extend at an angle rearward and upward as shown at 87a in FIG. 13 when the linkage is positioned to hold the convertible top up. A third linkage arm 88 extends generally parallel to the first linkage arm 85. This third linkage arm 88 is pivotally connected to the second linkage arm 87 at 89 just below the bend in linkage arm 87. The opposite end of the third linkage arm 88 is pivotally connected at 90 to a fourth linkage arm 91, which extends generally parallel to the second linkage arm 87. The fourth linkage arm 91 near its lower end in FIG. 13 is pivotally connected at 92 to the opposite end of the first linkage arm 85 from the latter's fixed pivot 86 on the side of the car body.

A short distance above its pivotal connection at 90 to the third linkage arm 88, the upper end of the fourth linkage arm 91 is connected rigidly to a cross bar 92 which extends horizontally over to the top of the fourth linkage arm 91 at the opposite side of the car. As shown in FIG. 14, this cross bar 92 is snugly received in bushings 93 fastened to the bottom of the convertible top T. Consequently, when the linkage is retracted from the raised position shown in FIG. 13 to the lowered position shown in FIG. 15, the cross bar 92 will pull the convertible top T back down.

The upper ends of the respective second linkage arms 87, 87a on opposite sides of the car are similarly interconnected by a rigid cross bar 94 (FIG. 13), which is coupled to the convertible top T in the same manner as the cross bar 92.

A fifth linkage arm 95 at each side of the car has its lower end in FIG. 13 pivotally connected at 96 to the first linkage arm 85 a short distance behind the latter's pivotal connection at 92 to the fourth linkage arm 91. The opposite end of the fifth linkage arm 95 (i.e., the upper end in FIG. 13) is pivotally connected at 97 to a sixth linkage arm 98, which has one of its ends pivotally connected at 99 to the fourth linkage arm 91 a very short distance behind the pivot 97 in FIG. 13.

The opposite end of the sixth linkage arm 98 (i.e., the front end in FIGS. 13 and 14) is connected by a horizontal hinge 100 to one end of a seventh linkage arm 101. Midway along its length the seventh linkage arm 101 supports an upwardly projecting post 102, whose upper end is joined to a cross bar 103 extending over to a similar post on the seventh linkage arm at the opposite side of the car. This cross bar 103 is coupled to the convertible top T by bushings 104 (FIG. 14) affixed to the bottom of the convertible top and snugly receiving the cross bar 103.

At the opposite end from the hinge 100 (i.e., the front end in FIGS. 13 and 14) the seventh linkage arm 101 is joined to a front cross piece 105 which extends horizontally over to the seventh linkage arm at the opposite side of the car. This front cross piece presents a bottom flange 106 (FIG. 14) which, when the convertible top is fully extended (FIG. 13), rests on top of the remaining segment S of the original hard roof of the car just behind the windshield W at the top. The front cross piece 105 also presents a curved top wall 107 which blends smoothly with the curvature of the windshield W when the convertible top is fully extended, as shown in FIG. 13.

As best seen in FIG. 14, the sixth and seventh linkage arms 98 and 101 are interconnected by additional linkage arms. An eighth linkage arm 108 is horizontally pivoted at one of its ends at 109 to a bracket 110 which is welded to the sixth linkage arm 98 above the latter's pivot 99. At its opposite end the eighth linkage arm 108 is formed with an elongated slot 111 which slidably receives a cross pin 112 carried by a ninth linkage arm 113. The ninth linkage arm 113 at one end is pivotally connected at 114 to a bracket 115 welded to the sixth linkage arm 98. The opposite end of the ninth linkage arm 113 is pivotally connected at 116 to one end of a tenth linkage arm 117, which has its opposite end pivoted at 118 to a bracket 119 welded to the seventh linkage arm 101.

FIG. 13 shows the convertible top in its fully extended position, and FIG. 15 shows it in its fully retracted position. When the linkage is retracted, most of the flexible convertible top T is folded down into the space immediately behind the reinforcing frame 65.

Figure 17:
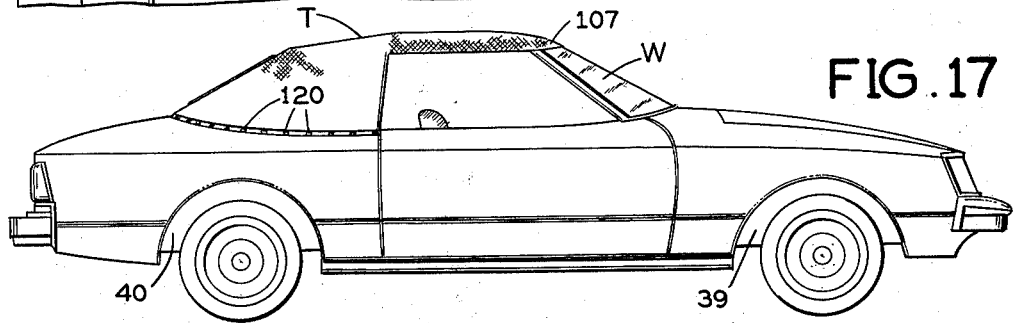
FIG. 17 is a side elevation of the four-seat car with the convertible top up.
Figure 18:
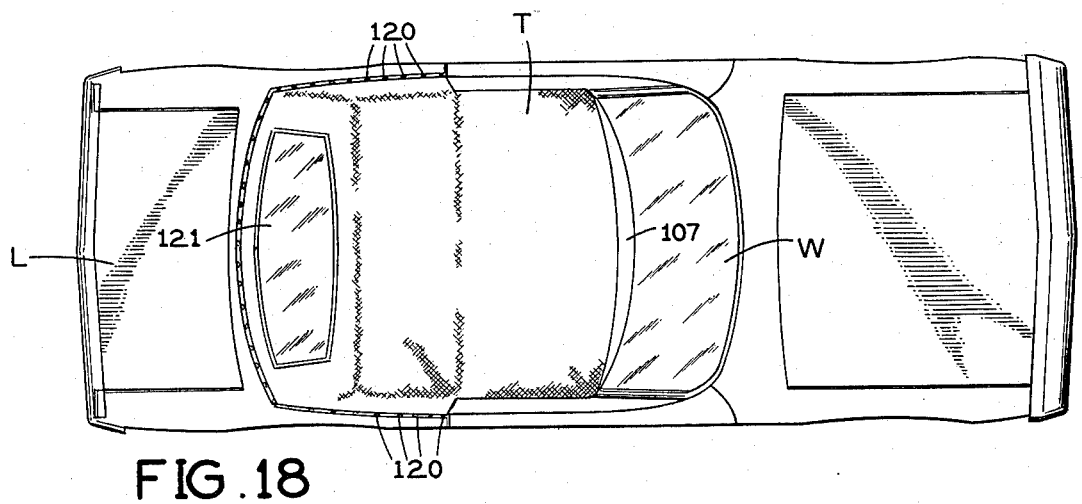
FIG. 18 is a top plan view of the four-seat car with the top up.
Figure 19:
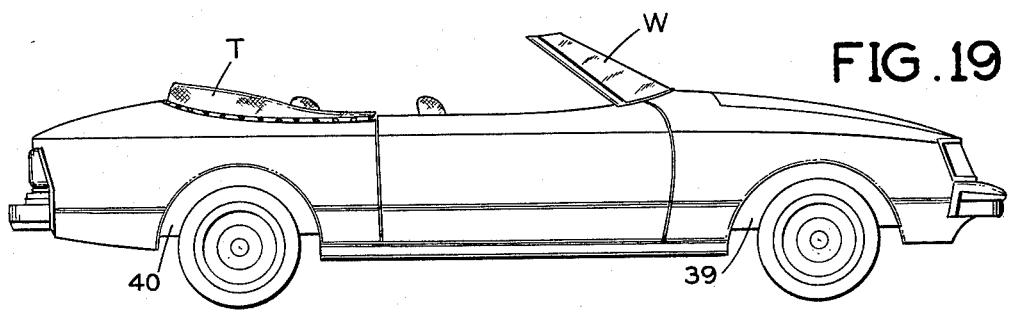
FIG. 19 is a side elevation of the four-seat car with the top down.
Figure 22:
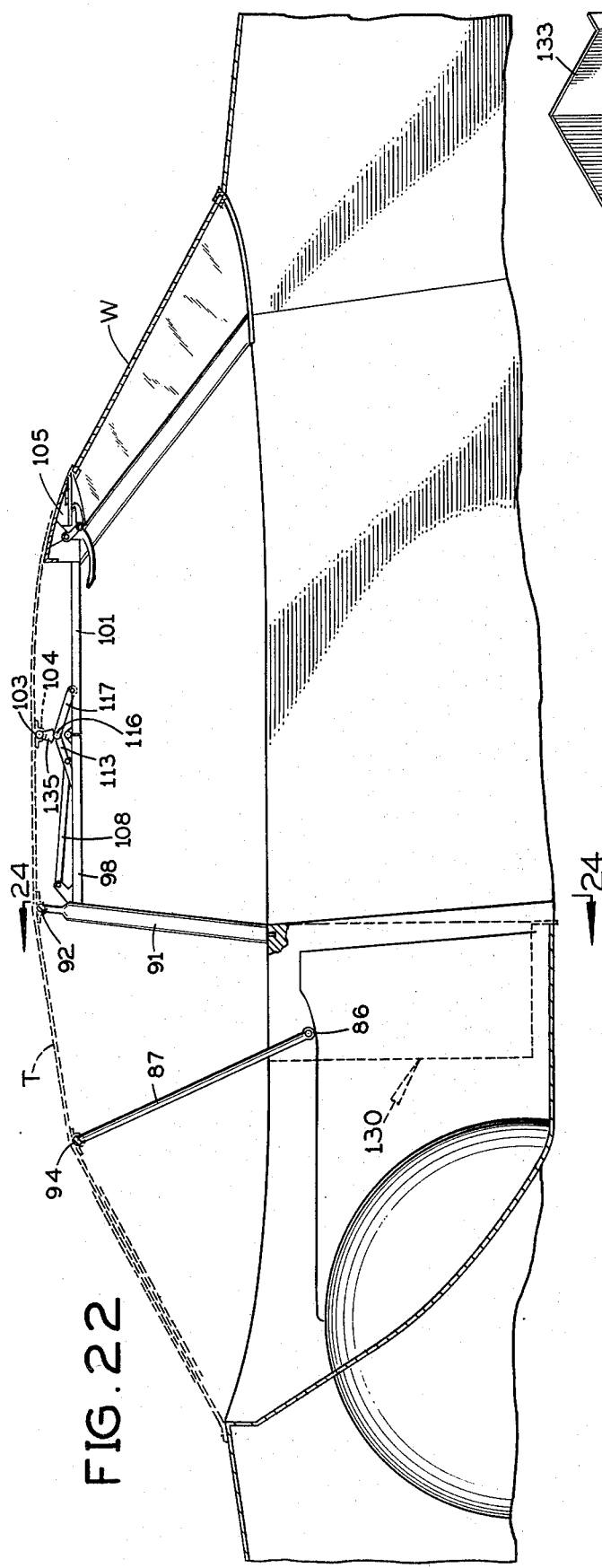
FIG. 22 is a longitudinal vertical section taken along the line 22—22 in FIG. 20.

As shown in FIGS. 17 and 18 the convertible top fabric is secured by suitable fasteners 120 to the car body from a point immediately behind each door and extending rearward along each side of the car body and across the back just in front of the trunk lid hinge. As shown in FIG. 18, the convertible top T includes a rear window which extends at a forward and upward inclination when the convertible top is fully extended.

Two-Seat Car—FIGS. 20-26

Figure 3:
FIG. 3 is a fragmentary bottom plan view taken from the line 3—3 in FIG. 1 and showing a reinforcing tube inserted in the rocker panel on one side of the car.
Figure 4:
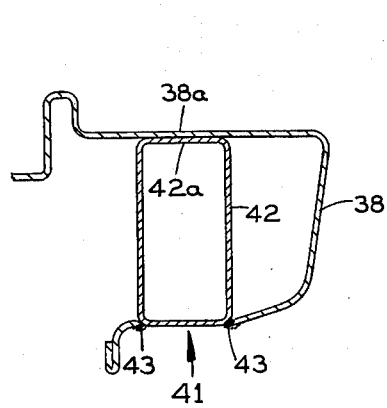
FIG. 4 is an enlarged vertical cross-section taken along the line 4—4 in FIG. 3.
Figure 5:
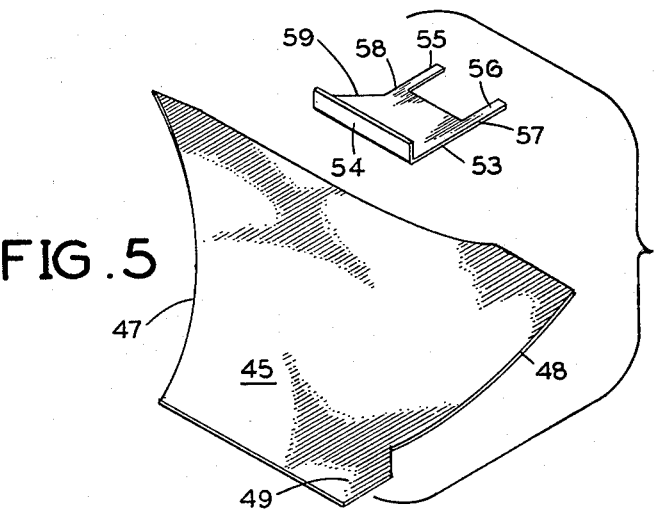
FIG. 5 is a perspective view of reinforcing plates for different parts of the car body.

In the two-seat car the original hard roof is removed as already described for the four-seat car, the two reinforcing tubes 42 are welded inside the rocker panels 38 as shown in FIGS. 3 and 4, the two reinforcing plates 45 are welded to the sides of the car body at the front of the rear wheel wells as shown in FIG. 7, and the two reinforcing plates 53 are welded to the sides of the car body just in front of the door openings as shown in FIG. 7, all in the manner already described in detail with reference to the four-seat car. The reinforcing frame 65 (FIG. 8) and the two reinforcing plates 75 (FIG. 9) which are used in the four-seat car are not used in the two-seat car.

Figure 23:
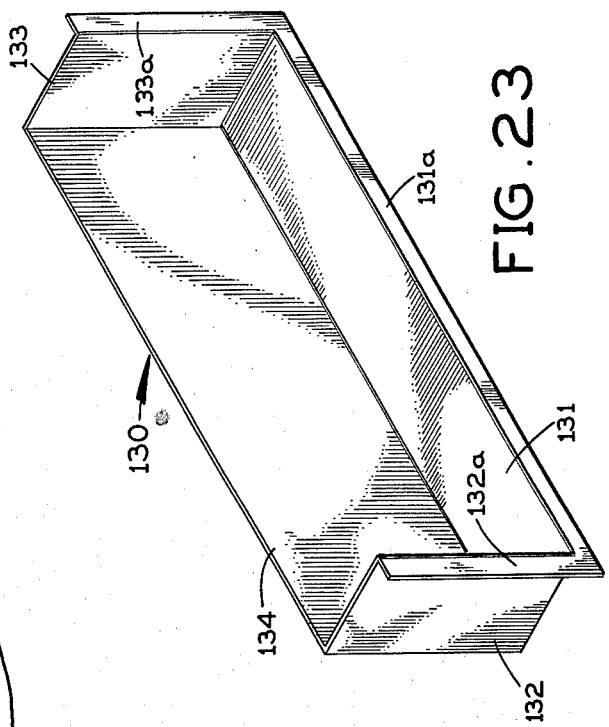
FIG. 23 is a perspective view of a reinforcing frame used in this car behind the front seats.
Figure 27:
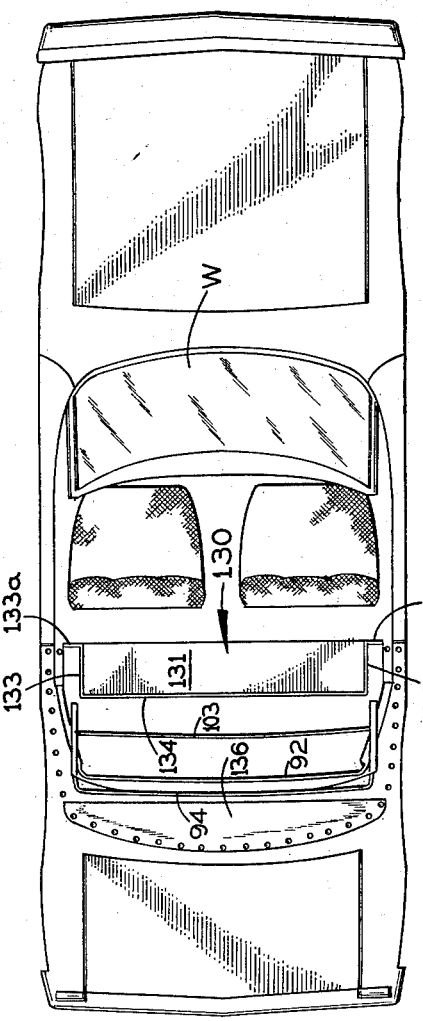
FIG. 27 is a top plan view of the two-seat car with the convertible top down.

In the two-seat car a reinforcing frame 130 as shown in FIG. 23 is welded to the floor of the car body directly behind the front seats, as shown in FIGS. 24, 26 and 27. This reinforcing frame has a flat bottom wall 131, upstanding flat opposite end walls 132 and 133, and an upstanding flat rear wall 134. Each of these walls is rectangular. The end walls 132 and 133 extend perpendicular to the bottom wall 131 and the back wall 134, and the back wall extends perpendicular to the bottom wall and the end walls. A short flange extends laterally outward from each end wall and downward from the bottom wall. The respective segments of this flange are designated by the reference numerals 131a, 132a and 133a in FIG. 23.

This reinforcing frame 130 extends across substantially the complete interior width of the car body of a short distance behind the front seats and a short distance in front of the rear wheel wells 40. It is welded to the floor of the car body to enhance the rigidity and strength of the car body in this region.

The flexible convertible top T and the operating linkage for extending and retracting it are essentially the same as already described in detail for the four-seat car. However, the front cross bar 103 in this linkage has a different mounting in the two-seat car. This cross bar is attached at its opposite ends to short depending ears 135 (FIG. 21). Each of these ears is attached to the rest of the linkage at the pivotal connection 116 between linkage arms 113 and 117. Another difference in the convertible top operating linkage in the two-seat car is that the linkage arms 87 are straight, instead of being bent as in the four-seat car.

The lower back end of the convertible top in the two-seat car is formed by a flexible and resilient panel 136 (FIG. 25) of suitable transparent plastic. At its curved back edge 137 this panel is fastened to the body of the car directly in front of the trunk lid hinge, as shown in FIG. 26. This panel 136 flexes down to the position shown in FIG. 26 when the convertible top is retracted. When the convertible top is up (FIG. 22) the panel 136 extends upward and forward at an acute angle and provides the rear window of the car.

I claim:

1. A method of changing a two-door passenger car having a permanently attached hard roof to one having a foldable convertible top which comprises the steps of:
    removing from the car body above the level of the top of its doors the supports for the roof and substantially the entire roof itself rearward from the windshield;
    attaching reinforcing members inside the rocker panels of the car body;
    attaching reinforcing plates to the opposite sides of the car body at the inside just above the floor between the rear wheel wells and the respective door posts;
    attaching reinforcing plates to the opposite sides of the car body at the inside just above the floor immediately in front of the door opening on each side;

and attaching to the opposite sides of the car body a pivoted linkage for operating a foldable convertible top between a raised position extending over the passenger compartment of the car and a lowered position folded up behind the passenger compartment.

2. A method according to claim 1, wherein said attaching of the reinforcing members inside the rocker panels comprises the steps of:
cutting an opening in the bottom of each rocker panel along substantially its entire length between the front and rear wheel wells;
inserting a hollow rectangular reinforcing tube up into each rocker panel through said bottom opening;
and welding the inserted tube to the rocker panel along each longitudinal edge of the bottom opening therein.

3. A method according to claim 1, wherein the car is a four-seat car, and further comprising the step of:
attaching to the opposite sides of the car body at the inside a reinforcing frame which extends across the inside of the car body directly behind the rear seat.

4. A method according to claim 3, wherein said reinforcing frame is welded to the inside of the rear wheel wells at the front thereof.

5. A method according to claim 4, and further comprising the step of:
attaching to the inside of the car body on each side of the trunk lid a reinforcing plate which is inclined laterally inward and upward between an attachment to the adjacent side of the car body laterally outward beyond the trunk lid and an attachment to the top of the car body directly in front of the trunk lid.

6. A method according to claim 5, wherein said attaching of the reinforcing members inside the rocker panels comprises the steps of:
cutting an opening in the bottom of each rocker panel along substantially its entire length between the front and rear wheel wells;
inserting a hollow rectangular reinforcing tube up into each rocker panel through said bottom opening;
and welding the inserted tube to the rocker panel along each longitudinal edge of the bottom opening therein.

7. A method according to claim 1, and further comprising the step of:
attaching to the car body on each side of the trunk lid a reinforcing plate which is inclined laterally inward and upward between an attachment to the adjacent side of the car body laterally outward beyond the trunk lid and an attachment to the top of the car body directly in front of the trunk lid.

8. A method according to claim 1, wherein said car has front seats only, and further comprising the step of:
attaching to the car body at the floor behind the front seats and in front of the rear wheel wells a reinforcing frame which extends across substantially the complete interior width of the car.

9. A method according to claim 8, wherein said reinforcing frame is a rectangular box-like structure with a flat bottom wall, upstanding opposite side walls and an upstanding back wall, and is open at the front and at the top.

10. A method according to claim 9, wherein said attaching of the reinforcing members inside the rocker panels comprises the steps of:
cutting an opening in the bottom of each rocker panel along substantially its entire length between the front and rear wheel wells;
inserting a hollow rectangular reinforcing tube up into each rocker panel through said bottom opening;
and welding the inserted tube to the rocker panel along each longitudinal edge of the bottom opening therein.

11. In a two-door passenger car having a foldable convertible top, the improvement which comprises:
reinforcing members extending inside the rocker panels of the car body along substantially their entire length between the front and rear wheel wells on each side;
reinforcing plates attached to the opposite sides of the car body on the inside just above the floor between the rear wheel wells and the respective door posts;
reinforcing plates attached to the opposite sides of the car body on the inside just above the floor immediately in front of the door opening on that side;
and a hinged operating linkage for the convertible top attached to each side of the car body.

12. A car according to claim 11, wherein said reinforcing member inside each rocker panel is a hollow rectangular tube welded to the bottom of the respective rocker panel.

13. A car according to claim 11, wherein the car is a four-seat car, and further comprising:
a reinforcing frame attached to the opposite sides of the car body at the inside and extending across the inside of the car body directly behind the rear seat.

14. A car according to claim 13, wherein said reinforcing frame is welded to the inside of the rear wheel wells at the front thereof.

15. A car according to claim 14, and further comprising:
a reinforcing plate attached to the inside of the car body on each side of the trunk lid, said reinforcing plate being inclined laterally inward and upward between an attachment to the adjacent side of the car body laterally outward beyond the trunk lid and an attachment to the top of the car body directly in front of the trunk lid.

16. A car according to claim 15, wherein said reinforcing member inside each rocker panel is a hollow rectangular tube welded to the bottom of the respective rocker panel.

17. A car according to claim 11, and further comprising:
a reinforcing plate attached to the inside of the car body on each side of the trunk lid, said reinforcing plate being inclined laterally inward and upward between an attachment to the adjacent side of the car body laterally outward beyond the trunk lid and an attachment to the top of the car body directly in front of the trunk lid.

18. A car according to claim 11 having front seats only, and further comprising:
a reinforcing frame attached to the car body at the floor behind the front seats and in front of the rear wheel wells and extending across substantially the complete interior width of the car.

19. A car according to claim 18, wherein said reinforcing frame is a rectangular box-like structure with a flat bottom wall, upstanding opposite side walls, and an upstanding back wall, and is open at the front and at the top.

20. A car according to claim 19, wherein said reinforcing member inside said rocker panel is a hollow rectangular tube welded to the bottom of the respective rocker panel.

* * * * *